(No Model.)
O. & W. THUM.
STICKY FLY PAPER.
No. 414,606. Patented Nov. 5, 1889.
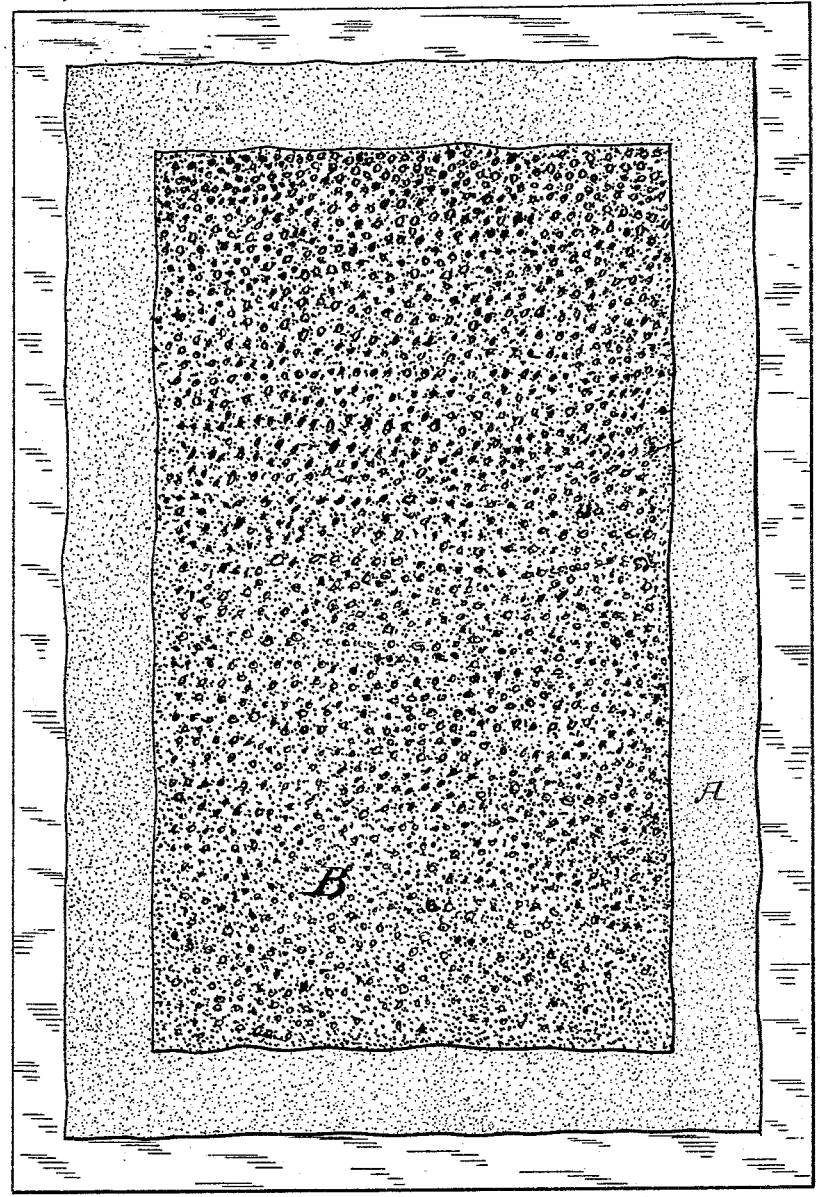
Fig. 1.
Fig. 2.
Fig. 3.
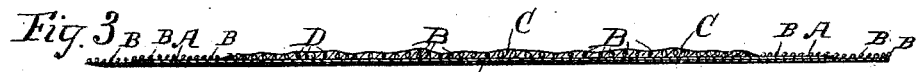
Fig. 4.
WITNESSES
C. T. Beer
J. W. Robinson.
INVENTORS.
William Thum & Otto Thum.
By Chas. E. Barber
Their Attorney in fact.

UNITED STATES PATENT OFFICE.

OTTO THUM AND WILLIAM THUM, OF GRAND RAPIDS, MICHIGAN.

STICKY FLY-PAPER

SPECIFICATION forming part of Letters Patent No. 414,606, dated November 5, 1889.

Application filed May 16, 1889. Serial No. 311,064. (No specimens.)

*To all whom it may concern:*

Be it known that we, OTTO THUM and WILLIAM THUM, citizens of the United States, residing at Grand Rapids, in the county of Kent, State of Michigan, have invented certain new and useful Improvements in Sticky Fly-Catcher Sheets, of which the following is so full, clear, and exact a description as will enable others skilled in the art to which our invention appertains to make and use the same, reference being had to the accompanying drawings, in which—

Figure 1 is perspective view of one of our improved surfaces. Figs. 2 and 3 are cross-sections of the same. Fig. 4 is a view of a modification, the projections being shown as extending over the entire sheet.

The objects of the invention are to prevent the sticky material from spreading or running over the clean margin and onto the back of the sheets while the paper is kept in stock; also, to keep the sticky material evenly distributed on the sheet while it is kept in stock. This we accomplish by providing the surface with projections which will not be affected to any appreciable extent by the ordinary variation of degrees of heat and cold and humidity incident to the surfaces during the process of handling at the manufactory, its shipment, and storage prior to its use as an insect-catcher. We may use small seeds, ground emery, fragments of any kind of hard resin, or coarse sand; or any kind of hard material not soluble in sticky material, or only slightly so, will serve the purpose, the present invention consisting, broadly, in providing the surface with projections of any kind to keep the ground-work of the sticky surface out of close contact with anything with which it may come in contact. Again, the hard substances or projections will, by reason of capillary attraction, have a tendency to keep the sticky substance from flowing over the surface. In some instances the surface may be provided with projections or depressions, or both, by corrugating, indenting, or otherwise producing irregular configurations in the material of which the ground-work of the surface is composed. These projections may be produced by sprinkling the surface with the material while in the condition of hard disintegrated particles; or if a material which is soluble or fusible at a moderately high degree of temperature and one which congeals at the ordinary degree of temperature—such as resin—be used it may be sprinkled or spread over the surface while hot and then be allowed to cool, care being taken to leave proper interstices between the deposits. After these projections shall have cooled and hardened, the softer sticky substance should be spread over the remaining surface, to be covered by it, within the margin which is to be left around the edges. This margin A is to be left free from sticky fly-catching material, and it is preferably coated or partially coated with a resinous compound or other suitable material to form a retainer for the sticky fly-catching material. It is so placed and of such a nature that it surrounds the sticky material within the edge of the sheets, and it slightly cements the clean borders of the facing leaves of the sheets together, in a manner to retain the sticky material until the sheets are opened for use.

The projections B, when produced by sprinkling, may be sprinkled over the surface either before the sticky substance C is applied to the surface or afterward; but we think it preferable to sprinkle the surface before the sticky substance C is applied, the projections being glued or otherwise secured to the sheet, as by that means the projections will have a firm hold on the surface proper, and being thus immovably secured to the surface of the ground-work of the sheets they will keep two adjacent surfaces well apart, even if the sticky material should become heated (or for any other reason) and have a tendency to flow beyond and without its proper precincts. Aside from this, such projections as are within the precincts of the sticky material will thus be coated with the sticky fly-catching material. The points of contact of the projections as they are pressed against another surface will be so comparatively small as to prevent them from adhering to my appreciably disadvantageous or injurious extent.

Instead of sprinkling the projections on before the sticky substance is applied, they might be mixed with the sticky substance itself, and would then serve to keep the main portions of the surfaces of the ground-work apart and would still be covered by the sticky substance, as shown at E, although we do not limit ourselves to having them so covered or coated.

For the purpose of shipping, there are from twenty-five to fifty sheets of fly-paper packed in a box. A considerable pressure is borne by the lower sheets, but if the proper-sized particles exist on the inner surface of the paper the pressure will fall entirely on them, and thus relieve the sticky material altogether, which then will not press out as would otherwise be the case, but will only flow out by its own tendency to spread, as any other semi-liquid would. This tendency alone will not spread the sticky material enough to do any special damage. The small particles also lessen the spreading tendency not due to pressure. They keep the sheets apart the distance of their (the particles) diameter, so that the leaves of the sheet could not come nearer together even if the sticky material lowered by spreading out.

After fly-papers are spread with sticky material the sheets often become wrinkled or wavy from various causes—such as absorbed moisture slightly swelling the backs of the paper—or the paper may be wavy to start with, &c. In such cases the sticky material will collect in the folds, leaving the remaining surface nearly bare. On opening such a sheet the sticky material will be found distributed unevenly. The small particles obviate this fault to a great degree, because a wrinkle formed in one leaf of the sheet will be held away from the other leaf by the small particles a sufficient distance to hold the proper amount of sticky material. Therefore it will not be pressed to one side.

In the form shown in Fig. 4 the projections extend over the entire sheet, thus making a sheet the surface of which is of an approximately-uniform height, which will keep the entire sheet straight and flat, and the sticky fly-catcher material will naturally remain where it belongs, and all portions of the sheet being in the same general plane and quite a distance apart when placed together it will have no considerable tendency to flow over the margin.

Having described our invention, what we desire to secure by Letters Patent, and what we therefore claim, is—

1. A sticky fly-paper having projections of granular material embedded thereon.

2. A sticky fly-paper having projections of granular material which is insoluble in the sticky material.

3. A sticky fly-paper provided with granular projections distributed over the sticky portion of the sheet, exceeding or as deep as the sticky material.

4. A sticky fly-paper provided with insoluble projections irregularly disposed over the sheet and surrounded by the sticky material.

5. A sticky fly-paper provided with irregular non-hygroscopic projections disposed over its surface.

6. A fly-catcher sheet provided with sticky fly-catcher material and having insoluble projections, substantially as described, for preventing the flow of the fly-catcher material.

In testimony whereof we affix our signatures in the presence of two witnesses.

OTTO THUM.
WILLIAM THUM.

Witnesses:
  FREDK. LOETTGERT,
  JOHN A. HARDEMAKER.